(12) United States Patent
Somlor et al.

(10) Patent No.: US 11,879,792 B2
(45) Date of Patent: Jan. 23, 2024

(54) MAGNETIC SENSING SYSTEM, DETECTION DEVICE, AND MAGNETIC INTERFERENCE OFFSET METHOD

(71) Applicant: XELA Robotics Co., Ltd., Tokyo (JP)

(72) Inventors: Sophon Somlor, Tokyo (JP); Alexander Schmitz, Tokyo (JP); Tito Pradhono Tomo, Tokyo (JP); Shigeki Sugano, Tokyo (JP)

(73) Assignee: XELA ROBOTICS CO., LTD., Tokyo (JP)

( * ) Notice: Subject to any disclaimer, the term of this patent is extended or adjusted under 35 U.S.C. 154(b) by 417 days.

(21) Appl. No.: 17/429,790

(22) PCT Filed: Jan. 31, 2020

(86) PCT No.: PCT/JP2020/003826
§ 371 (c)(1),
(2) Date: Aug. 10, 2021

(87) PCT Pub. No.: WO2020/170771
PCT Pub. Date: Aug. 27, 2020

(65) Prior Publication Data
US 2022/0120623 A1 Apr. 21, 2022

(30) Foreign Application Priority Data
Feb. 18, 2019 (JP) ................................. 2019-026955

(51) Int. Cl.
*G01L 1/00* (2006.01)
*G01L 1/12* (2006.01)

(52) U.S. Cl.
CPC ....................................... *G01L 1/12* (2013.01)

(58) Field of Classification Search
CPC ........... G01L 1/12; G01L 1/122; G01L 1/127; G01N 2203/005
(Continued)

(56) References Cited

U.S. PATENT DOCUMENTS

| 8,978,488 B2* | 3/2015 | Sato ................... G01L 1/2281 73/862.69 |
| 10,175,125 B1* | 1/2019 | Mortimer ............. G01D 11/10 |

(Continued)

FOREIGN PATENT DOCUMENTS

| JP | 2632451 B2 | 7/1997 |
| JP | 2011-112511 A | 6/2011 |
| JP | 5500957 B2 | 5/2014 |

OTHER PUBLICATIONS

International Search Report dated Feb. 25, 2020, issued in counterpart International Application No. PCT/JP2020/003826. (3 pages).

*Primary Examiner* — Max H Noori
(74) *Attorney, Agent, or Firm* — WHDA, LLP

(57) ABSTRACT

A magnetic sensing system 10 according to the present invention is provided with a sensing device 11 that generates an electrical signal according to the strength of a magnetic field that changes in response to the action of an external force, and a detection device 12 that detects a physical quantity associated with the action of the external force from a change in the magnetic field based on the electrical signal from the sensing device 11. The sensing device 11 includes magnetic field generation means 15 and 18 that generate a desired measurement magnetic field of different strengths from a site that is displaced by the action of the external force, and a magnetic field measurement means 19 that measures the strength of a surrounding magnetic field including the measurement magnetic field. The detection device 12 uses a relational expression stored in advance to specify, on the basis of fluctuations over time in the measurement magnetic field of different strengths, a magnetic interference amount corresponding to the strength of an interference magnetic field generated separately from the measurement magnetic field, and calculates the physical (Continued)

quantity by removing the influence of the magnetic interference amount.

8 Claims, 2 Drawing Sheets

(58) Field of Classification Search
USPC .................................................. 73/862, 625
See application file for complete search history.

(56) References Cited

U.S. PATENT DOCUMENTS

| | | | | |
|---|---|---|---|---|
| 2011/0184557 A1* | 7/2011 | Takeuchi | ................... | G01L 1/14 |
| | | | | 901/46 |
| 2014/0224038 A1* | 8/2014 | Masuda | ................... | G01L 1/122 |
| | | | | 73/862.69 |
| 2015/0204737 A1* | 7/2015 | Moran | ..................... | G01L 1/122 |
| | | | | 29/428 |
| 2019/0335981 A1* | 11/2019 | Hane | ................... | A61B 1/0011 |

* cited by examiner (A)

(B)

MAGNETIC SENSING SYSTEM, DETECTION DEVICE, AND MAGNETIC INTERFERENCE OFFSET METHOD

TECHNICAL FIELD

The present invention relates to a magnetic sensing system, a detection device, and a magnetic interference offset method, and more particularly, to a magnetic sensing system, a detection device, and a magnetic interference offset method that detect a physical quantity corresponding to the action of an external force in a state in which magnetic interference that influences a measurement taken with a magnetic sensor has been removed.

BACKGROUND ART

Robots that perform predetermined work while coexisting with humans are provided with various sensors for when a person or object present in the environment around the robot contacts the robot, such as force sensors that detect external forces such as pressing force and shear force acting on the contacted portion, and displacement sensors that detect the displacement of the contacted portion. Additionally, the motion of the robot is controlled on the basis of detected values from these various sensors. Known examples of these sensors are magnetic force sensors and displacement sensors using changes in a magnetic field in response to the action of an external force. Each magnetic sensor is provided with a displacement unit containing an elastic body or the like that is displaced by the action of an external force, a permanent magnet affixed to the displacement unit, and a magnetic sensor that detects the state of a measurement magnetic field generated by the permanent magnet. In each of these magnetic sensors, the permanent magnet is displaced as one with the displacement unit according to the magnitude of the acting external force, and by using the change in the strength of the magnetic field measured by the magnetic sensor in response to the displacement, the magnitude of the external force acting on the displacement unit and the displacement of the displacement unit are detected.

At this point, if geomagnetic influence or a magnetic material or the like that is magnetized by another magnetic body or the permanent magnet comes into proximity with the magnetic sensor, magnetic interference may occur with respect to the measurement magnetic field generated by the permanent magnet that is displaced in response to the action of an external force. As a result, the change in the measurement magnetic field cannot be detected accurately, and the magnitude of the external force or the displacement treated as physical quantities corresponding to the action of the external force cannot be detected accurately.

By the way, Patent Literature 1 discloses a magnetic force sensor that detects the magnitude of an external force with consideration for the magnetic interference described above. The magnetic force sensor is provided with: a magnet; a displaced magnetoelectric conversion element disposed facing the magnet at a predetermined distance from the surface on one side of the magnet and configured to be displaced in response to the action of an external force to thereby detect a magnetic field change occurring because of the external force; and a stationary magnetoelectric conversion element affixed on the surface on the other side of the magnet and configured not to be displaced in response to the action of the external force. With the stationary magnetoelectric conversion element, the strength of a magnetic field unrelated to the action of the external force is detected. Additionally, in the magnetic force sensor, the detection result obtained by the stationary magnetoelectric conversion element unrelated to the external force is subtracted from the detection result obtained by the displaced magnetoelectric conversion element corresponding to the application of the external force, and the magnitude of the external force is calculated.

CITATION LIST

Patent Literature

Patent Literature 1: Japanese Laid-Open No. 2011-112511

SUMMARY OF INVENTION

Technical Problem

However, with the magnetic force sensor according to Patent Literature 1, the additional stationary magnetoelectric conversion element is necessary to detect only the influence of magnetic interference. Moreover, the stationary magnetoelectric conversion element is provided on the opposite side from the displaced magnetoelectric conversion element that detects the magnetic field change occurring because of an external force, with the magnet in between. Consequently, the additional placement of such a stationary magnetoelectric conversion element hinders miniaturization of the sensor as a whole, and also restricts freedom in designing the sensor or a robot. Furthermore, because the stationary magnetoelectric conversion element exists at a distant position from the displaced magnetoelectric conversion element, if the conditions of the magnetic field occurring irrespectively of the action of the external force is different near these elements, there is also a problem of being unable to accurately remove the influence of magnetic interference in the displaced magnetoelectric conversion element for detecting the external force.

The present invention has been proposed to address such problems, and an objective thereof is to provide a magnetic sensing system, a detection device, and a magnetic interference offset method capable of removing the influence of magnetic interference to accurately detect a correct physical quantity associated with the action of an external force, such as the magnitude of the external force or the displacement of a site upon which the external force acts, and also in which the sensor portion attached to a site where the physical quantity is measured can be configured compactly.

Solution to Problem

To achieve the above objective, the present invention mainly adopts a configuration of a magnetic sensing system comprising a sensing device that generates an electrical signal according to the strength of a magnetic field that changes in response to the action of an external force and a detection device that detects a physical quantity associated with the action of the external force from a change in the magnetic field based on the electrical signal from the sensing device, wherein the sensing device comprises a magnetic field generation means that generates a desired measurement magnetic field of different strengths from a site that is displaced by the action of the external force, and a magnetic field measurement means that measures the strength of a surrounding magnetic field including the measurement magnetic field, and the detection device uses a relational expression stored in advance to specify, on a basis of fluctuations over time in the measurement magnetic field when the measurement magnetic field with different strengths is generated by the magnetic field generation means, a magnetic interference amount corresponding to the strength of an interference magnetic field generated near the magnetic field measurement means separately from the measurement magnetic field, and calculates the physical quantity by removing the influence of the magnetic interference amount.

The present invention also adopts a configuration of a detection device that varies the strength of a measurement magnetic field generated from a site that is displaced by the action of an external force, and detects a physical quantity associated with the action of the external force on a basis of the variation, wherein the detection device includes a function of using a relational expression stored in advance to specify a magnetic interference amount corresponding to the strength of an interference magnetic field generated nearby and separately from the measurement magnetic field when the measurement magnetic field is generated so as to vary in strength over time, and calculates the physical quantity by removing the influence of the magnetic interference amount.

Furthermore, the present invention adopts an offset method applied to a system that detects a physical quantity associated with the action of an external force on a basis of a variation in a measurement magnetic field generated from a site that is displaced by the action of the external force, the offset method removing an influence of a magnetic interference amount corresponding to the strength of an interference magnetic field generated nearby and separately from the measurement magnetic field when the physical quantity is detected, and comprising generating the measurement magnetic field so as to vary in strength over time, measuring the strength over time of a surrounding magnetic field resulting from the interference magnetic field influencing the measurement magnetic field, using a relational expression stored in advance to specify the magnetic interference amount from a result of the measurement and the strength of the measurement magnetic field, and calculating the physical quantity by removing the influence of the magnetic interference amount.

Note that in the specification and claims of the present invention, the term "over time" also considers the existence of mathematical methods that can be used to achieve the same goals and results with measurements and operations at a plurality of different times, irrespectively of the order of the plurality of different times.

Advantageous Effects of Invention

The present invention uses a magnetic field generation means that generates a measurement magnetic field of variable strength, and is configured to specify a magnetic interference amount in the state where the measurement magnetic field varying in strength over time is being generated by the magnetic field generation means, and offset the magnetic interference to detect a physical quantity associated with the action of an external force. Consequently, it is not necessary to provide a separate sensor for the purpose of measuring magnetic interference, and the sensor portion attached to the site where the physical quantity is measured can be configured compactly. Also, state changes in the measurement magnetic field associated with the action of the external force and the conditions of the interference magnetic field arising from the magnetic interference can be detected using a common magnetic field measurement means, and changes in the measurement magnetic field associated with the action of the external force can be detected accurately with the magnetic interference removed more reliably.

BRIEF DESCRIPTION OF DRAWINGS

FIG. 2 FIGS. 2(A) and 2(B) are conceptual diagrams illustrating the planar arrangement of sensor bodies according to a second embodiment.

DESCRIPTION OF EMBODIMENTS

Hereinafter, embodiments of the present invention will be described with reference to the drawings.

First Embodiment

Figure 1:
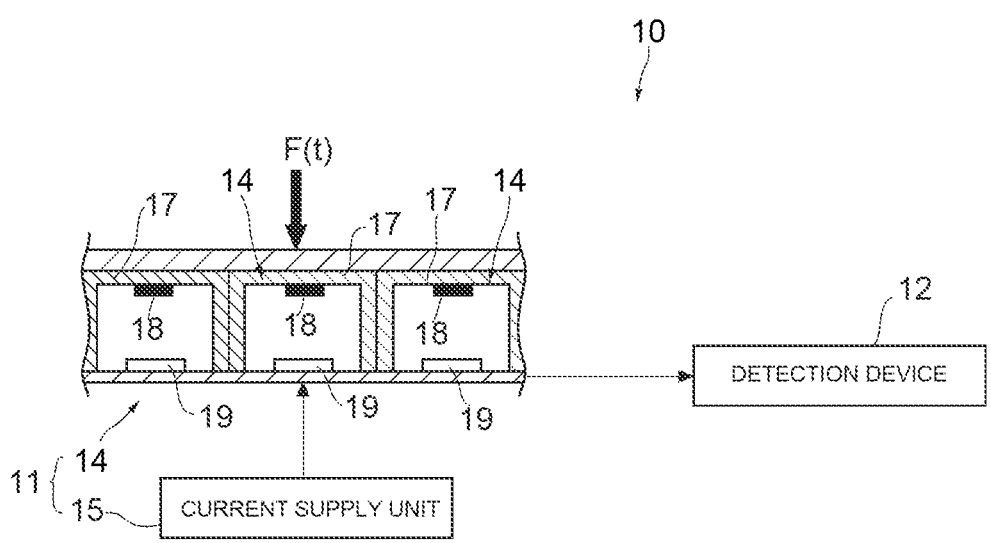
FIG. 1 is a schematic configuration diagram of a magnetic sensing system according to a first embodiment.

FIG. 1 is a schematic configuration diagram of a magnetic sensing system according to a first embodiment. In the diagram, the magnetic sensing system 10 is provided with a sensing device 11 that generates an electrical signal corresponding to the strength of a magnetic field that changes in response to the action of an external force, and a detection device 12 that detects a physical quantity associated with the action of the external force from a change in the magnetic field based on a measured value of the electrical signal from the sensing device 11. In the present embodiment, the magnetic sensing system 10 functions as a magnetic sensor that uses changes in a magnetic field in response to the action of an external force to detect the magnitude of the external force as a physical quantity.

The sensing device 11 includes sensor bodies 14 attached to desired sites where the external force is to be measured and configured to generate an electrical signal corresponding to the magnitude of the acting external force, and a current supply unit 15 connected to the sensor bodies 14 and configured to supply a current.

Each sensor body 14 is provided with a displacement unit 17 including an elastic body that is displaced by the action of the external force, an electromagnet 18 unified with the displacement unit 17, and a magnetic sensor 19 affixed across an air gap from the electromagnet 18 and configured to measure the strength of a surrounding magnetic field.

For the magnetic sensor 19, a sensor of known structure including an element that detects magnetism, a circuit board, and the like is adopted. When an external force is exerted on the displacement unit 17, the magnetic sensor 19 detects a change in the magnetic field due to the displacement of the electromagnet 18 unified with the displacement unit 17, and generates an electrical signal corresponding to the strength of the magnetic field.

The current supply unit 15 includes a function of supplying current to each electromagnet 18, and is configured to vary the amount of current supplied to each electromagnet 18 to change the strength of a measurement magnetic field, namely the magnetic field emanating from the electromagnet 18.

In the above, the current supply unit 15 and the electromagnets 18 form magnetic field generation means that generate measurement magnetic fields of different strengths of desired values from each site that is displaced by the action of the external force. Also, each magnetic sensor 19 forms a magnetic field measurement means that measures the strength of the surrounding magnetic field, including the measurement magnetic field. Note that the magnetic field generation means according to the present invention is not limited to the configuration in the present embodiment, and any of various types of magnetic field generation devices and systems may be adopted insofar as the configuration generates the measurement magnetic field while also adjusting and varying the strength of the measurement magnetic field. Moreover, the magnetic field measurement means is not limited to the configuration of the magnetic sensor 19 according to the present embodiment, and any of various types of equipment and systems may be adopted as long as similar effects are obtained.

The detection device 12 includes a predetermined processing circuit and a computer, and as described later, when calculating the magnitude of the external force on the basis of a measured value from the magnetic sensor 19, the detection device 12 includes a function of offsetting the magnetic interference caused by a magnetic field (interference magnetic field) generated around the magnetic sensor 19 separately from the measurement magnetic field from the electromagnet 18.

In other words, the detection device 12 is configured as follows to use a relational expression stored in advance to specify, on the basis of fluctuations over time in the measurement magnetic field generated by the electromagnet 18, a magnetic interference amount corresponding to the strength of the interference magnetic field associated with the magnetic interference, and calculate the magnitude of the external force by removing the influence of the magnetic interference amount. Note that although the following describes a force sensor that detects the magnitude of an external force in a single axis direction, the present invention is not limited thereto, and a similar method is adoptable with respect to a force sensor that detects the magnitude of an external force in multiple axis directions.

First, the relationship expressed in the following Expression (1) holds among a measured value M(t) by the magnetic sensor 19 at a time t, the magnitude F(t) of an external force acting at the time t, the strength E(t) of the measurement magnetic field generated by the electromagnet 18 at the same time t, and the magnetic interference amount D(t) at the same time t. The relational expression is stored in advance in the detection device 12.

$$M(t)=f(F(t))\cdot E(t)+D(t) \qquad (1)$$

Here, f(F(t)) represents a function that takes the magnitude F(t) of an external force as an input value and calculates, from the magnitude F(t) of the external force, a coefficient by which to multiply the strength E(t) of the measurement magnetic field. The function is specified by calibration work performed in advance.

Additionally, from the measured value M(t) actually measured by the magnetic sensor 19 and the known magnitude E(t) of the measurement magnetic field generated by the electromagnet 18 according to the adjustment of the current supply unit 15, the magnitude F(t) of the external force acting at that time and the magnetic interference amount D(t) are calculated as follows according to Expression (1) above. Namely, the magnitude F(t) of the external force calculated here is a value offset by the magnetic interference from the relationship in Expression (1) above.

Specifically, in a short time between the times t1 and t2, if the magnitudes F(t1) and F(t2) of the external force acting on the same sensor body 14 are the same and the magnetic interference amounts D(t1) and D(t2) are also the same, the value of the current supplied from the current supply unit 15 to the electromagnet 18 is varied to vary the strength of the measurement magnetic field generated by the electromagnet 18 between the two times t1 and t2.

At this point, the measured values M(t1) and M(t2) actually measured by the magnetic sensor 19 at the times t1 and t2 and the strengths E(t1) and E(t2) of the measurement magnetic field generated by the electromagnet 18 at the times t1 and t2 are known. Consequently, according to Expression (1) above, the following system of simultaneous equations holds between the magnitude F(t1)=F(t2)=Fx of the external force imparted to the displacement unit 17 and the magnetic interference amount D(t1)=D(t2)=Dy, and from this system of simultaneous equations, the magnitude Fx of the external force and the magnetic interference amount Dy are calculated.

$$M(t1)=f(Fx)\cdot E(t1)+Dy$$

$$M(t2)=f(Fx)\cdot E(t2)+Dy$$

Here, at either time t1 or t2, the supply of current from the current supply unit 15 may also be stopped to set the magnitude E(t1) or E(t2) of the measurement magnetic field generated by the electromagnet 18 to zero. Also, by varying the amount of current supplied to the electromagnet 18 with respect to time according to a predetermined function, it is also possible to vary the strength E(t) of the measurement magnetic field generated by the electromagnet 18 regularly or periodically with respect to time. For example, the current supply from the current supply unit 15 may be controlled such that the strength E(t) of the measurement magnetic field varies sinusoidally with respect to time. Furthermore, the strengths E(t1) and E(t2) of the measurement magnetic field at the times t1 and t2 are preferably not tiny in order to detect the external force with high precision, and for the same reason, a large difference between the strengths E(t1) and E(t2) of the measurement magnetic field is preferable.

The above calculation of the external force according to the first embodiment presumes that the magnitude of the external force acting between the times t1 and t2 is constant, and therefore it is beneficial to estimate a period during which the magnitude of the external force will be constant from information such as a trend based on past measurement results, and perform the process described above using a measured value from the magnetic sensor 19 during the period.

Note that although the above describes a method of solving a system of simultaneous equations from measurements taken at the two times t1 and t2, it is mathematically possible to obtain a result with the same or better accuracy from a set of measured values taken at more times by using the least squares method, for example.

Next, a modification of the first embodiment above will be described.

In this modification, if the acting external force is different at the two times t1 and t2, the measurement results from a plurality of sensor bodies 14 disposed in proximity to each other are used to calculate, from Expression (1) above, the magnitude of the external force acting at each of the times t1 and t2 and the magnetic interference amount influencing the detection of the external force at each of the sensor bodies 14.

Namely, in the detection device 12 according to the modification, the measurement results from sensor bodies 14 in two adjacent locations disposed such that an external force of the same magnitude acts at the same time are used to calculate the external force acting at the times t1 and t2 as follows. Note that in the following description, M1(t1) and M1(t2) denote the measured values at the times t1 and t2 by the magnetic sensor 19 in a first sensor body 14, while M2(*t*1) and M2(*t*2) denote the measured values at the times t1 and t2 by the magnetic sensor 19 in the other second sensor body 14. Also, the magnitudes of the external force acting at the times t1 and t2 are denoted Fx(t1) and Fx(t2).

First, different current values are supplied at the same time from the current supply unit 15 to each of the electromagnets 18 in the adjacent sensor bodies 14, thereby causing the electromagnets 18 to generate measurement magnetic fields of different strengths at the same time. Moreover, under the above conditions, each of the electromagnets 18 is made to generate measurement magnetic fields of different strengths at the times t1 and t2. In the following, the strengths of the measurement magnetic fields generated by the electromagnet 18 of the first sensor body 14 at the times t1 and t2 are denoted E(M1, t1) and E(M1, t2). Also, the strengths of the measurement magnetic fields generated by the electromagnet 18 of the second sensor body 14 at the times t1 and t2 are denoted E(M2, t1) and E(M2, t2).

At this point, the magnetic interference amount corresponding to the interference magnetic field that influences the detection of the external force is different for each magnetic sensor 19 in each of the sensor bodies 14 installed at different locations, but the magnetic interference amount Dy(M1) in the magnetic sensor 19 of the first sensor body 14 and the magnetic interference amount Dy(M2) in the magnetic sensor 19 of the second sensor body 14 are each processed in a short time that does not change between the times t1 and t2. In the above conditions, the measured values M1(*t*1) and M1(*t*2) at the times t1 and t2 from the magnetic sensor 19 in the first sensor body 14 and the measured values M2(*t*1) and M2(*t*2) at the times t1 and t2 from the magnetic sensor 19 in the second sensor body 14 are actually measured and are therefore known. Also, the strengths E(M1, t1), E(M1, t2), E(M2, t1), and E(M2, t2) of the measurement magnetic fields generated by each of the electromagnets 18 are ascertained in advance and are therefore known. Consequently, these known values are used to obtain from Expression (1) above a system of simultaneous equations treating the magnitudes Fx(t1) and Fx(t2) of the external force acting at the times t1 and t2 and the magnetic interference amounts Dy(M1) and Dy(M2) in each magnetic sensor 19 as variables, and these variables are found by solving the system of simultaneous equations.

$$M1(t1)=f(Fx(t1))\cdot E(M1,t1)+Dy(M1)$$

$$M2(t1)=f(Fx(t1))\cdot E(M2,t1)+Dy(M2)$$

$$M1(t2)=f(Fx(t2))\cdot E(M1,t2)+Dy(M1)$$

$$M2(t2)=f(Fx(t2))\cdot E(M2,t2)+Dy(M2)$$

Note that in the case where the magnetic interference amount changes depending on the time, the magnitude of the external force and the magnetic interference amount are calculated from Expression (1) as described above by disposing the magnetic sensors 19 in the first and second sensor bodies 14 such that the same magnetic interference amount is measurable at the same time. Also, in this case, the magnitude of the external force and the magnetic interference amount are calculated similarly by specifying a relationship between the magnetic interference amount and the time for each magnetic sensor 19.

Next, a second embodiment of the present invention will be described. Note that in the following description, configuration portions which are the same or similar to the first embodiment are denoted using the same signs, and a description of such portions is reduced or omitted.

Second Embodiment

Figure 2:
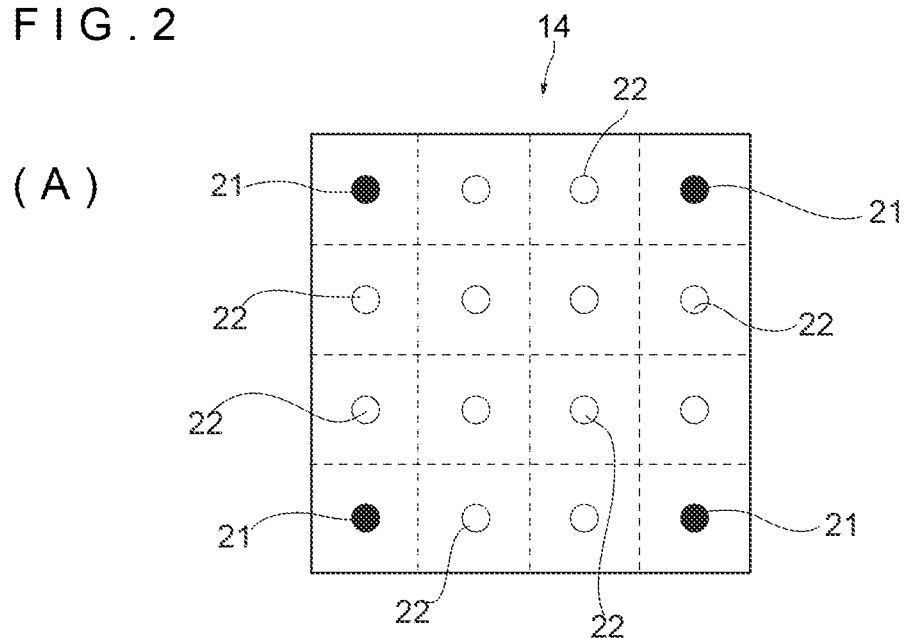
Figure 2:
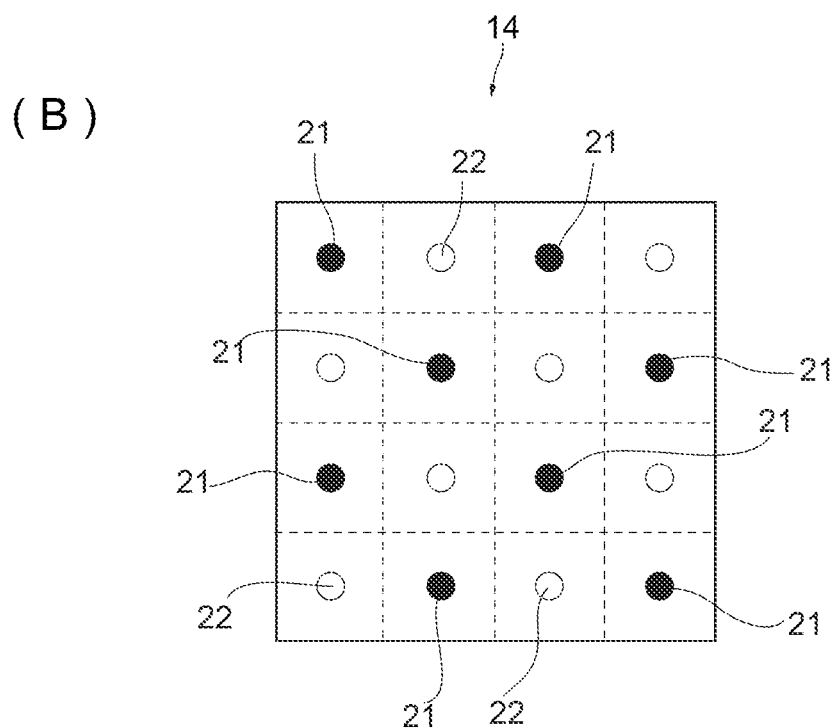

In the present embodiment, as exemplified in FIGS. 2(A) and 2(B), several of a plurality of sensor bodies 14 disposed uniformly along a predetermined plane are disposed as offset sensors 21 not influenced by an external force, while the remainder are disposed as external force detection sensors 22 upon which the external force acts. The magnetic body forming each of these sensors 21 and 22 is not limited to the electromagnet 18, and a magnetic body of any type, such as a permanent magnet, may be adopted. Here, as an example, the offset sensors 21 are configured by the magnetic sensor 19 only, without providing a magnetic body such as the electromagnet 18 in the displacement unit 17, while the external force detection sensors 22 use the same configuration as the sensor bodies 14 in the first embodiment.

In the detection device 12 according to the present embodiment, by specifying the magnetic interference amount from detection results from the offset sensors 21 and then subtracting the magnetic interference amount from the measured values from the external force detection sensors 22, the external force acting on the sensor body 14 is calculated with the magnetic interference offset. Additionally, from the detection results from the offset sensors 21 at a plurality of nearby locations, the magnetic interference amount at the position of an external force detection sensor 22 provided between the offset sensors 21 may be obtained by a predetermined calculation on the basis of the relative distance to each offset sensor 21, and the magnetic interference amount may be subtracted from the measured value from the external force detection sensor 22.

According to the second embodiment, because the offset sensors 21 are disposed in the same plane as the external force detection sensors 22, the thickness of the sensor body 14 can be minimized compared to the case of disposing the sensors 21 and 22 in the thickness direction.

Note that although the foregoing embodiments illustrate and describe an example of causing the magnetic sensing system 10 to function as a magnetic force sensor, the present invention is not limited thereto, and is also applicable to a magnetic sensing system that functions as a magnetic displacement sensor that detects a displacement of a site acted upon by an external force as a physical quantity associated with the action of the external force. In other words, the present invention is applicable generally to systems that function as various types of magnetic sensors that detect a predetermined physical quantity according to a change in a magnetic field.

Otherwise, the configuration of each component of the devices in the present invention is not limited to the illustrated configuration examples, and various modifications are possible insofar as substantially the same effects are exhibited.

REFERENCE SIGNS LIST 10 magnetic sensing system
11 sensing device
12 detection device
14 sensor body
15 current supply unit (magnetic field generation means)
17 displacement unit
18 electromagnet (magnetic field generation means)
19 magnetic sensor (magnetic field measurement means)

The invention claimed is:

1. A magnetic sensing system comprising a sensing device that generates an electrical signal according to the strength of a magnetic field that changes in response to the action of an external force and a detection device that detects a physical quantity associated with the action of the external force from a change in the magnetic field based on the electrical signal from the sensing device, wherein
the sensing device comprises a magnetic field generation means that generates a desired measurement magnetic field of different strengths from a site that is displaced by the action of the external force, and a magnetic field measurement means that measures the strength of a surrounding magnetic field including the measurement magnetic field, and
the detection device uses a relational expression stored in advance to specify, on a basis of fluctuations over time in the measurement magnetic field when the measurement magnetic field with different strengths is generated by the magnetic field generation means, a magnetic interference amount corresponding to the strength of an interference magnetic field generated near the magnetic field measurement means separately from the measurement magnetic field, and calculates the physical quantity by removing the influence of the magnetic interference amount.

2. The magnetic sensing system according to claim 1, wherein
the relational expression is a numerical expression that expresses a relationship among a measured value from the magnetic field measurement means, the physical quantity, the strength of the measurement magnetic field, and the magnetic interference amount.

3. The magnetic sensing system according to claim 2, wherein
the magnetic field generation means generates the measurement magnetic field with different strengths at two predetermined times, and
the detection device uses the relational expression to calculate the magnetic interference amount and the physical quantity from the strengths of the measurement magnetic field at the two times and measured values from the magnetic measurement means at the two times.

4. The magnetic sensing system according to claim 2, wherein
the magnetic field generation means generates measurement magnetic fields with mutually different strengths at the same time from at least two locations, and also generates the measurement magnetic field with different strengths at two predetermined times at each of the locations, and
the detection device uses the relational expression to calculate the magnetic interference amount and the physical quantity from the strengths of the measurement magnetic field at the two times generated at each of the locations and measured values from the magnetic measurement means at the two times corresponding to each of the locations.

5. A magnetic sensing system comprising a sensing device that generates an electrical signal according to the strength of a magnetic field that changes in response to the action of an external force and a detection device that detects a physical quantity associated with the action of the external force from a change in the magnetic field based on the electrical signal from the sensing device, wherein
the sensing device comprises a sensor body attached to a site where the physical quantity is to be measured and a current supply unit connected to the sensor body and configured to supply a current,
the sensor body comprises a displacement unit that is displaced by the action of the external force, an electromagnet unified with the displacement unit, and a magnetic sensor configured to measure the strength of a surrounding magnetic field,
the current supply unit is configured to supply a current to the electromagnet so as to vary the strength of a measurement magnetic field generated by the electromagnet, and
the detection device uses a relational expression stored in advance to specify, on a basis of fluctuations over time in the measurement magnetic field generated by the electromagnet, a magnetic interference amount corresponding to the strength of an interference magnetic field generated near the magnetic sensor separately from the measurement magnetic field, and calculates the physical quantity by removing the influence of the magnetic interference amount.

6. A magnetic sensing system comprising a plurality of sensor bodies disposed along a predetermined plane and configured to generate an electrical signal according to the strength of a magnetic field that changes in response to the action of an external force, and a detection device that detects a physical quantity associated with the action of the external force from a change in the magnetic field based on the electrical signal from the sensor bodies, wherein
the plurality of sensor bodies include an offset sensor disposed so as not to be influenced by the external force and an external force detection sensor upon which the external force acts, and
the detection device specifies, from a detection result from the offset sensor, a magnetic interference amount corresponding to the strength of an interference magnetic field generated near the sensor bodies separately from a measurement magnetic field treated as a measurement target for the physical quantity, and subtracts the magnetic interference amount from a measured value obtained by the external force detection sensor to calculate the external force acting on the sensor bodies.

7. A detection device that varies the strength of a measurement magnetic field generated from a site that is displaced by the action of an external force, and detects a physical quantity associated with the action of the external force on a basis of the variation, wherein
the detection device includes a function of using a relational expression stored in advance to specify a magnetic interference amount corresponding to the strength of an interference magnetic field generated nearby and separately from the measurement magnetic field when the measurement magnetic field is generated so as to vary in strength over time, and calculates the physical quantity by removing the influence of the magnetic interference amount.

8. An offset method applied to a system that detects a physical quantity associated with the action of an external force on a basis of a variation in a measurement magnetic field generated from a site that is displaced by the action of the external force, the offset method removing an influence of a magnetic interference amount corresponding to the strength of an interference magnetic field generated nearby and separately from the measurement magnetic field when the physical quantity is detected, comprising:

generating the measurement magnetic field so as to vary in strength over time, measuring the strength over time of a surrounding magnetic field resulting from the interference magnetic field influencing the measurement magnetic field, using a relational expression stored in advance to specify the magnetic interference amount from a result of the measurement and the strength of the measurement magnetic field, and calculating the physical quantity by removing the influence of the magnetic interference amount.

* * * * *